Patented Nov. 15, 1927.

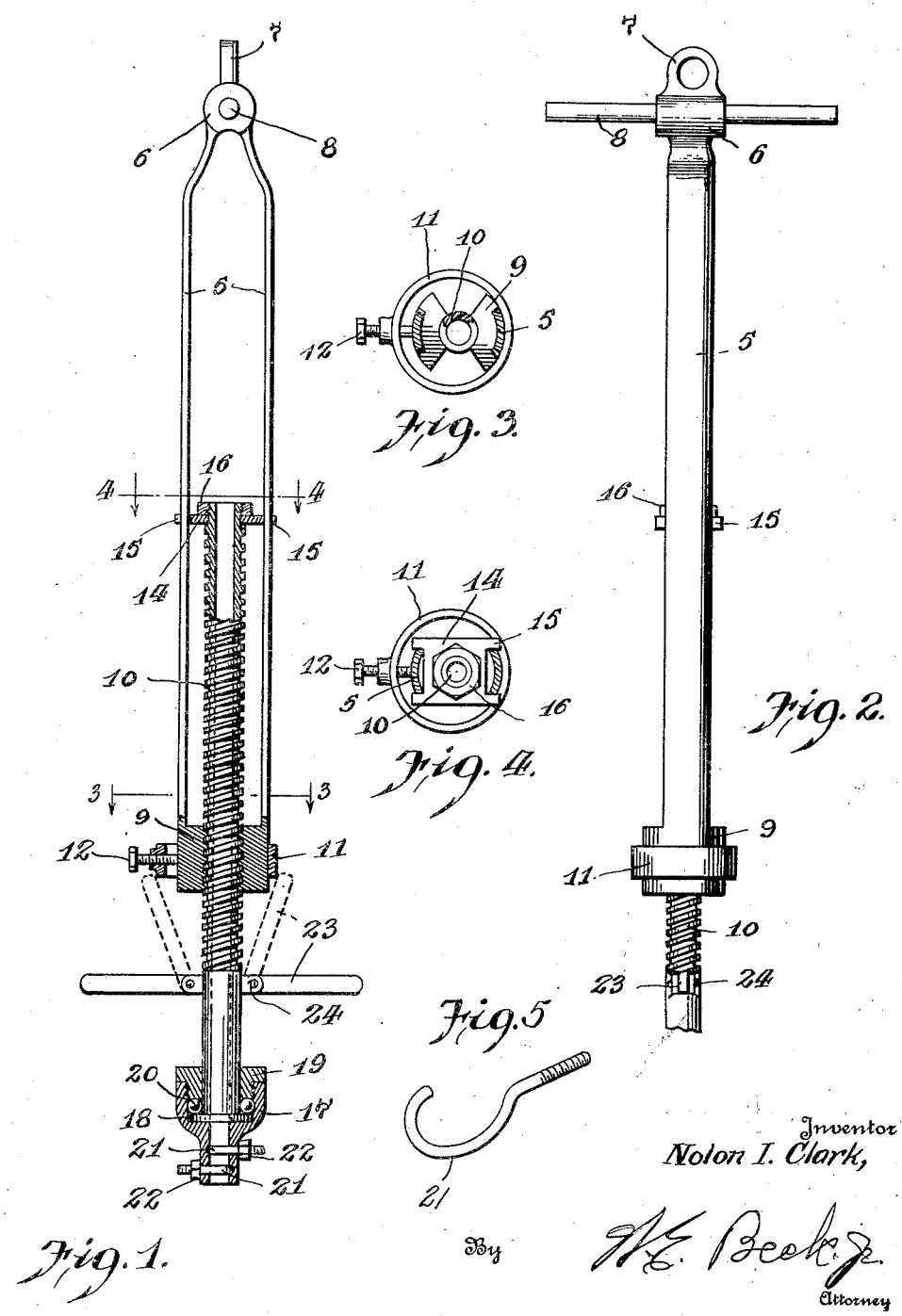

1,649,573

UNITED STATES PATENT OFFICE.

NOLON I. CLARK, OF BEGGS, OKLAHOMA.

PUMP GRIP.

Application filed June 25, 1926. Serial No. 118,609.

My invention relates to adjustable pump grips and has for its principal object to provide an adjustable hollow screw for spacing the sucker rods in oil or water wells.

Another object is to provide an apparatus of this character which may be manipulated by one man, thus reducing the labor expenses to a minimum.

A further object is to provide a device which can be operated on any standard pump rig, which is simple and strong in construction, efficient in performance and inexpensive to manufacture.

Other objects and advantages will become apparent from the following detailed description when viewed together with the accompanying drawing forming part hereof, wherein like numerals refer to like parts throughout, and in which Figure 1 is an elevational view with parts in section.

Figure 2 is a side elevational view.

Figure 3 is a transverse sectional view taken on a line 3—3 of Figure 1,

Figure 4 is a similar view taken on a line 4—4 of Figure 1, and

Figure 5 is a perspective view of one of the rod attaching hooks.

Referring now to the drawings wherein for the purpose of illustration I have shown a preferred form of my invention, I provide a stirrup composed of a pair of vertically disposed hangers 5 converging toward their upper ends to form a head 6 above which is provided a lifting ring 7. The head is provided with a bore within which is fitted a trunnion 8 by means of which the device may be suspended from the walking beam of the well rig. The hangers 5 are preferably constructed of strap iron and curved to conform to the arc of a circle as shown in the Figures 3 and 4, and at the lower ends thereof the hangers are provided with enlarged butts 9 having threaded segments along their inner faces to engage the external threads of a hollow screw 10, the butts in effect constituting a pair of jaws for gripping the screw and vertically adjustable by means of the threaded engagement.

An annular ring 11 is fitted around the butt ends 9 of the hangers and of a slightly larger circumference and having a tightening screw 12 carried therein with its inner end adapted to be forced against one of the butt ends whereby to increase the gripping tendency thereof.

The upper end of the hollow screw 10 is provided with a guide 14 in the form of a substantially square shaped plate, having projections 15 at each corner between which the hangers are slidably fitted. A nut 16 is threaded over the end of the hollow screw above the guide to secure the same in position.

At the lower end of the hollow screw I provide a polishing rod coupler comprising a hollow socket member 17 with an enlarged bore at its upper end, the walls of which are internally threaded. The end of the hollow screw terminates in an annular flange 18 fitted within the base of the bore of the socket and an externally threaded hollow plug 19 is carried on the hollow screw for threaded engagement with the socket thereby swivelly connecting the socket member to the hollow screw. Ball bearings 20 are placed between the flange 18 and the plug 19 to facilitate rotary movement therebetween, the bearings being so placed as to carry the pulling force of the rod 10 inserted in the coupling.

The lower end of the coupling is reduced in diameter and is provided with a pair of rod clamp members 21 extending laterally at opposite sides therefrom with hooks at their inner ends for embracing the rod and threaded studs at their outer ends upon which are arranged nuts 22 for tightening the clamp members about the rod.

Handles 23 are arranged upon the lower portion of the hollow screw immediately above the rod coupling and are pivotally connected for swinging upwardly to lugs 24 integrally formed on the screw.

While I have shown the preferred embodiment of my invention, it is to be understood that various changes in the size, shape, and arrangement of parts may be resorted to without departing from the spirit of the invention and the scope of the appended claims.

I claim:

1. In combination with a temper screw or the like having a flange formed at the lower end thereof of a rod coupler comprising an externally threaded plug swivelly carried on the temper screw and retained by said flange, an internally threaded socket member adapted to receive the flanged end of the temper screw and attachable to the plug, a bore in said socket member for receiving a well tool, a pair of clamping members arranged in said bore and extending laterally from the socket member and tightening means therefor.

2. In combination with a temper screw or the like having a flange formed at the lower end thereof of a rod coupler comprising an externally threaded plug swivelly carried on the temper screw and retained by said flange, a socket member adapted to receive the flanged end of the temper screw and threadedly secured to the plug, antifriction means between the flange and the plug and arranged to carry the weight of the socket member, a bore in said socket member for receiving a well tool, a pair of opposed rod clamping members operatively positioned in said bore and having shanks extending laterally from the socket member and means on the shanks for tightening the clamping members to the rod.

In testimony whereof I affix my signature.

NOLON I. CLARK.